(12) United States Patent
Bae

(10) Patent No.: US 7,248,989 B2
(45) Date of Patent: Jul. 24, 2007

(54) SPEED MEASUREMENT SYSTEM FOR SPEED CONTROL OF HIGH-SPEED MOTORS

(75) Inventor: Bon-Ho Bae, Torrance, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/207,173

(22) Filed: Aug. 18, 2005

(65) Prior Publication Data

US 2007/0043528 A1 Feb. 22, 2007

(51) Int. Cl.
*G01P 11/00* (2006.01)
*G01P 3/00* (2006.01)

(52) U.S. Cl. .................... 702/142; 702/145
(58) Field of Classification Search ............. 702/41, 702/44, 142, 145, 190, 191
See application file for complete search history.

(56) References Cited

U.S. PATENT DOCUMENTS

| | | | | |
|---|---|---|---|---|
| 5,377,295 A | * | 12/1994 | Ueda et al. | 388/815 |
| 5,886,491 A | * | 3/1999 | Yoshida et al. | 318/592 |
| 5,962,999 A | * | 10/1999 | Nakamura et al. | 318/432 |
| 6,653,964 B2 | * | 11/2003 | Mizuno et al. | 341/155 |

* cited by examiner

*Primary Examiner*—Michael Nghiem
(74) *Attorney, Agent, or Firm*—Christopher DeVries

(57) ABSTRACT

A system for measuring speed of a high-speed motor using a moving average filter. A position sensor generates a rotor position signal. A signal processing module determines a rotor angle from the rotor position signal. A speed observer module calculates a raw speed of the motor from the rotor angle. A filter module selectively generates a filtered speed of the motor from the raw speed of the motor. A frequency-to-period converter module calculates a rotor period from one of the raw speed of the motor and the filtered speed of the motor. A divider module calculates number of points in a moving average from the rotor period. A moving average filter module adjusts a window size of the moving average to the rotor period. A moving average filter removes ripple and harmonics of the ripple from the raw speed of the motor.

10 Claims, 14 Drawing Sheets

SPEED MEASUREMENT SYSTEM FOR SPEED CONTROL OF HIGH-SPEED MOTORS

FIELD OF THE INVENTION

The present invention relates to speed control of high-speed motors, and more particularly to systems and methods for measuring speed of high-speed AC motors.

BACKGROUND OF THE INVENTION

In a feedback control system used to control speed of a motor, the speed of the motor is measured and fed back to the control system. FIG. 1 shows a typical system 20 that controls speed of an AC motor 22. A rotor position sensor, such as a resolver 24 or an encoder (not shown), and a signal processing module 26 measure rotor angle $\theta_{rm}$. A speed measurement module 28 determines motor speed $\omega_{rm}$ from the rotor angle. A comparator module 30 determines the difference $\omega_{rm\_err}$ between the measured speed $\omega_{rm}$ and a command speed $\omega_{rm^*}$. The difference is fed to a speed controller module 32 that generates a torque command $T_{e^*}$ to minimize the difference. Based on the torque command, a torque-to-current mapping module 34 generates command currents $I_{ds}^{e^*}$ and $I_{qs}^{e^*}$.

Current sensors (not shown) measure stationary phase motor currents $I_{as}$, $I_{bs}$, and $I_{cs}$. A stationary to synchronous phase converter module 36 converts the currents $I_{as}$, $I_{bs}$, and $I_{cs}$ to d and q-axis synchronous phase currents $I_{ds}^{e}$ and $I_{qs}^{e}$.

A comparator module 38 determines the difference between the currents $I_{ds}^{e^*}$ and $I_{ds}^{e}$. Another comparator module 40 determines the difference between the currents $I_{qs}^{e^*}$ and $I_{qs}^{e}$. Based on the difference in the currents, a current controller module 42 generates synchronous phase command voltages $V_{ds}^{e^*}$ and $V_{qs}^{e^*}$.

A synchronous to stationary phase converter module 44 converts the voltages $V_{ds}^{e^*}$ and $V_{qs}^{e^*}$ to stationary phase command voltages $V_{a^*}$, $V_{b^*}$, and $V_{c^*}$. Based on the command voltages, an inverter module 46 generates 3-phase voltages that drive the motor at the command speed.

The motor speed should be accurately measured because errors in measured speed are fed back to the control system and can cause speed fluctuations, system instability, and motor heating. Due to factors such as eccentricity of position sensor, inaccuracy of electrical module, etc., the rotor angle typically has a periodic error, as shown in FIG. 2. Consequently, the motor speed calculated from the rotor angle has a fluctuating error called ripple, as shown in FIG. 3. The ripple is fed back to the speed controller module and distorts the command currents, as shown in FIG. 4. The ripple in command currents, in turn, distorts the command voltages that drive the motor. As a result, the motor speed fluctuates. Consequently, the motor currents that are measured and fed back to the control system contain ripple, as shown in FIG. 4. This renders the control system unstable. The ripple in motor speed also causes heating and loss due to harmonics. Notably, the magnitude of the ripple is proportional to the motor speed. Therefore, motor speed fluctuation, control system instability, and motor heating are high at high motor speeds.

Traditionally, the ripple is minimized by using a low-pass filter, as shown in FIG. 5. The cut-off frequency of the filter, however, cannot be set so low as to completely eliminate the ripple because the low cut-off frequency causes delay in the feedback loop. Alternately, the ripple can also be minimized by lowering the control bandwidth of the speed controller, current control, and a speed observer. This method, however, sacrifices control dynamics and is therefore inadequate for speed control of high-speed motors.

SUMMARY OF THE INVENTION

Accordingly, the present invention provides a system for measuring speed of a high-speed motor.

In another feature, a position sensor generates a rotor position signal.

In another feature, a signal processing module determines a rotor angle from the rotor position signal.

In another feature, a speed observer module calculates a raw speed of the motor.

In another feature, a filter module selectively generates a filtered speed of the motor from the raw speed of the motor.

In another feature, a frequency-to-period converter module calculates a rotor period from one of the raw speed of the motor and the filtered speed of the motor.

In still another feature, a divider module calculates number of points in a moving average from the rotor period.

In yet another feature, a moving average filter module adjusts a window size of the moving average to the rotor period.

In another feature, a moving average filter removes ripple and harmonics of the ripple from the raw speed of the motor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
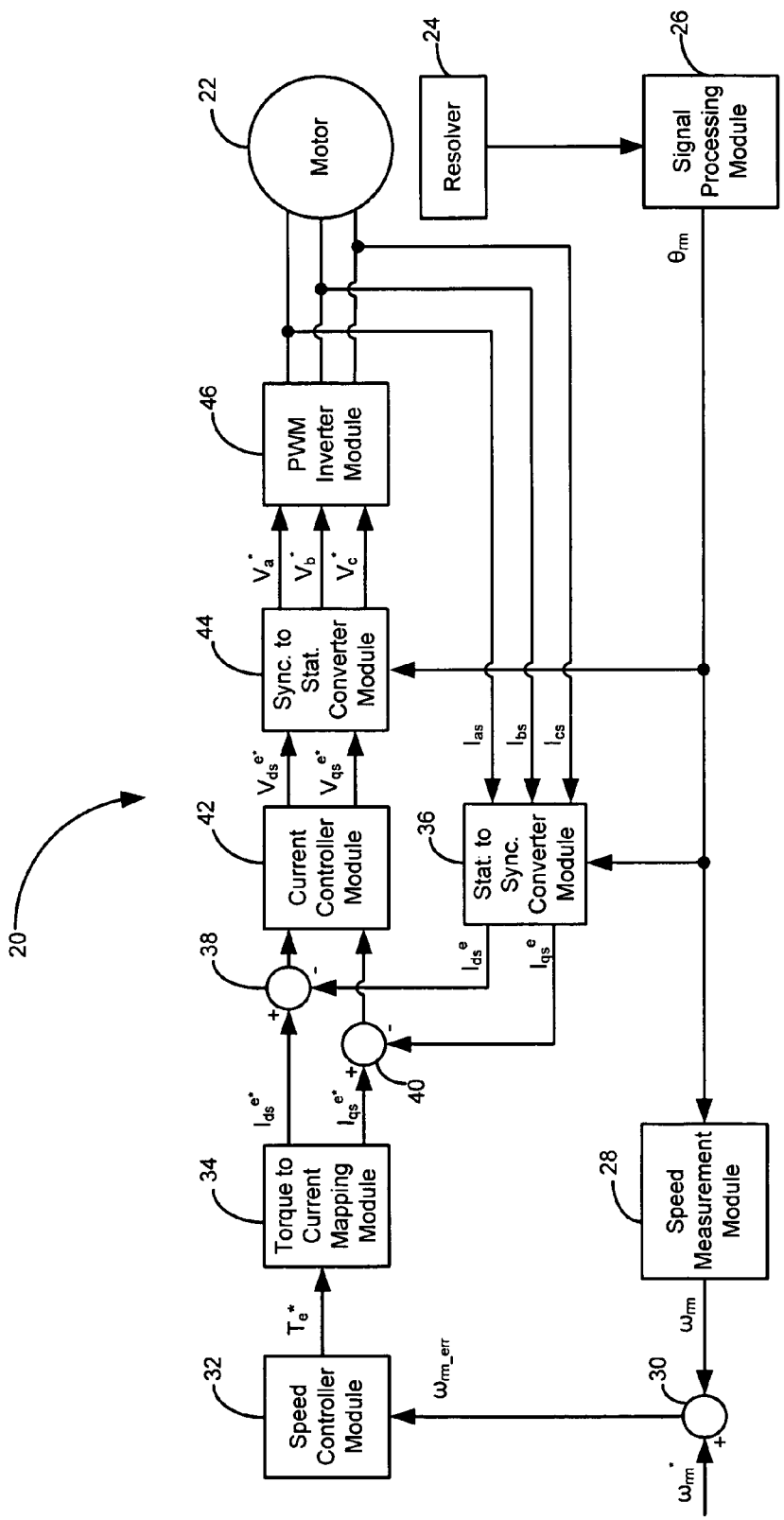
FIG. 1 is a functional block diagram illustrating a typical control system that controls the speed of a motor.
Figure 2:
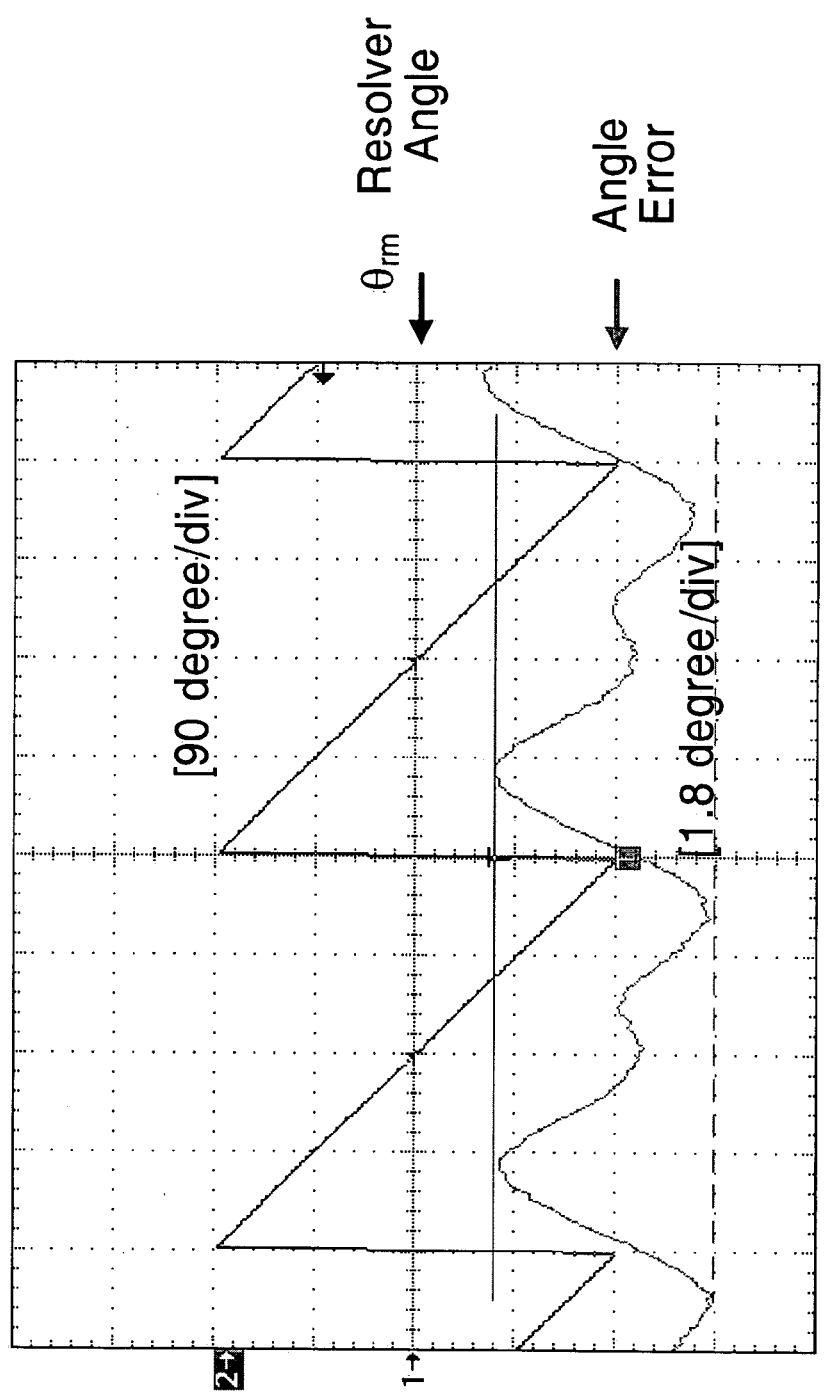
FIG. 2 is a graph illustrating an exemplary error in rotor angle measured using a position sensor.
Figure 3:
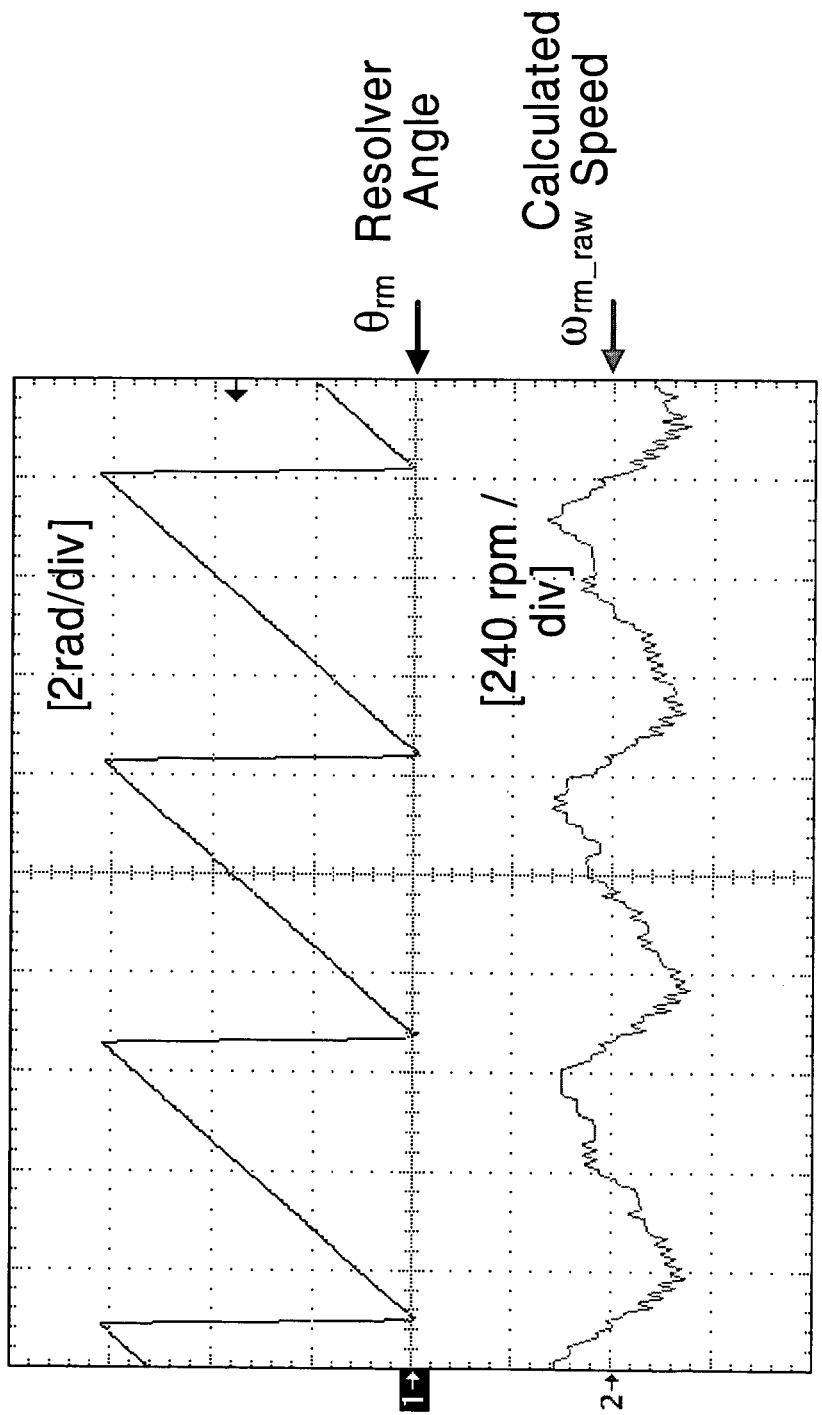
FIG. 3 is a graph illustrating exemplary ripple component of motor speed calculated from rotor angle.
Figure 4:
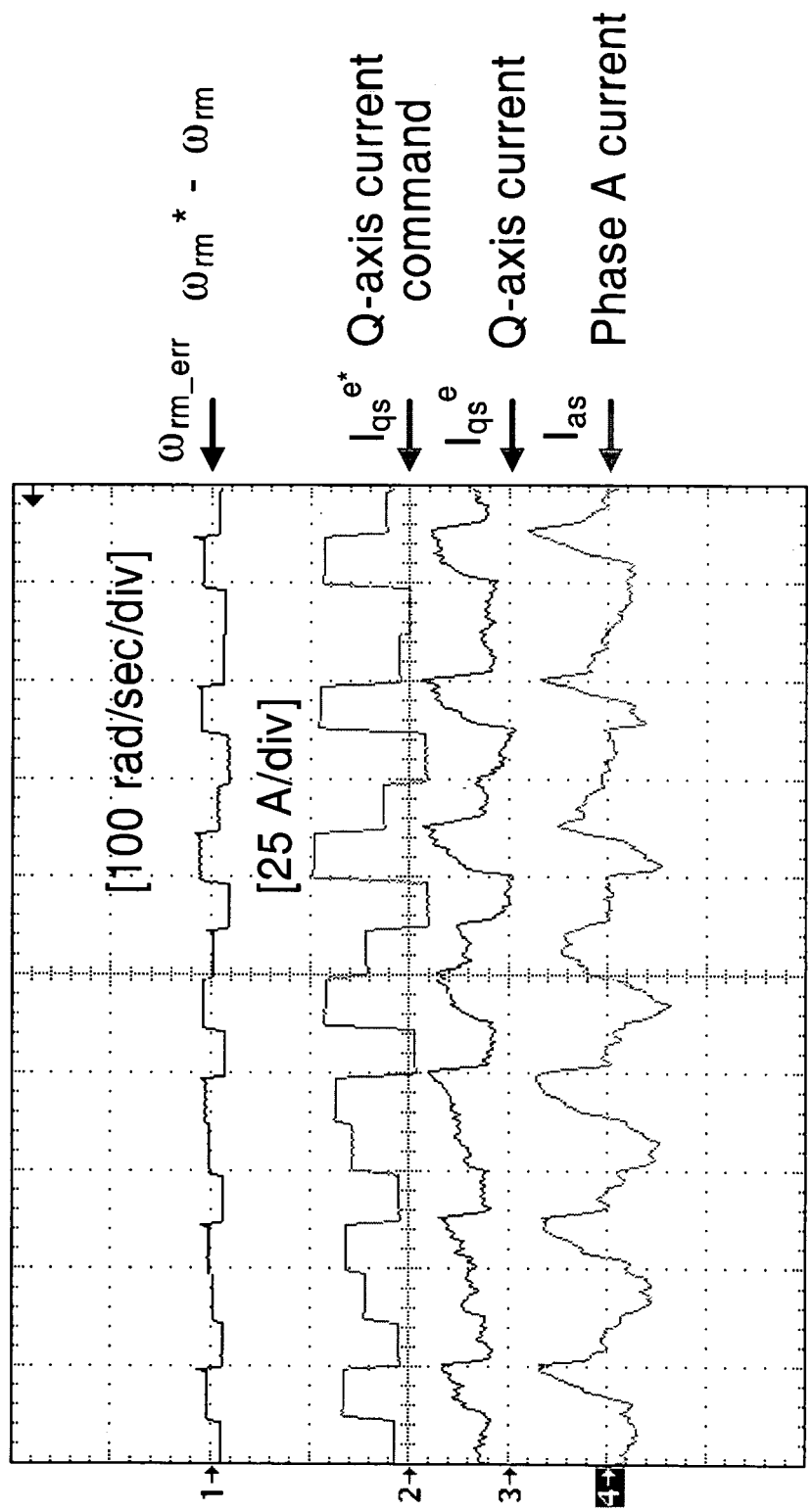
FIG. 4 is a graph illustrating exemplary current waveforms generated using speed with ripple.
Figure 5:
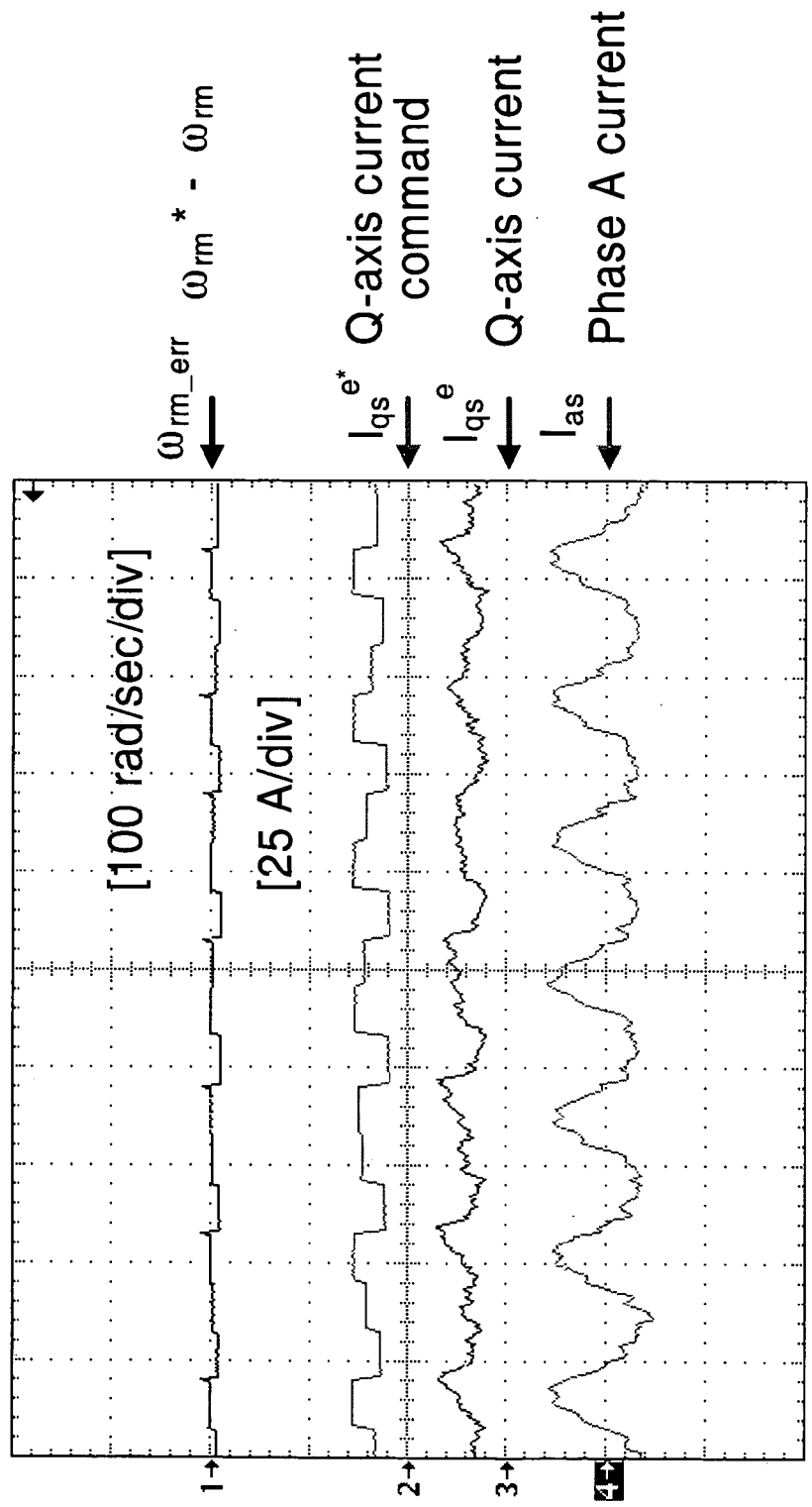
FIG. 5 is a graph illustrating exemplary current waveforms generated using speed information obtained by using a low-pass filter.

The following description of the preferred embodiment(s) is merely exemplary in nature and is in no way intended to limit the invention, its application, or uses. For purposes of clarity, the same reference numbers will be used in the drawings to identify similar elements. As used herein, the term module, controller and/or device refers to an application specific integrated module (ASIC), an electronic module, a processor (shared, dedicated, or group) and memory that execute one or more software or firmware programs, a combinational logic module, and/or other suitable components that provide the described functionality.

Figure 6:
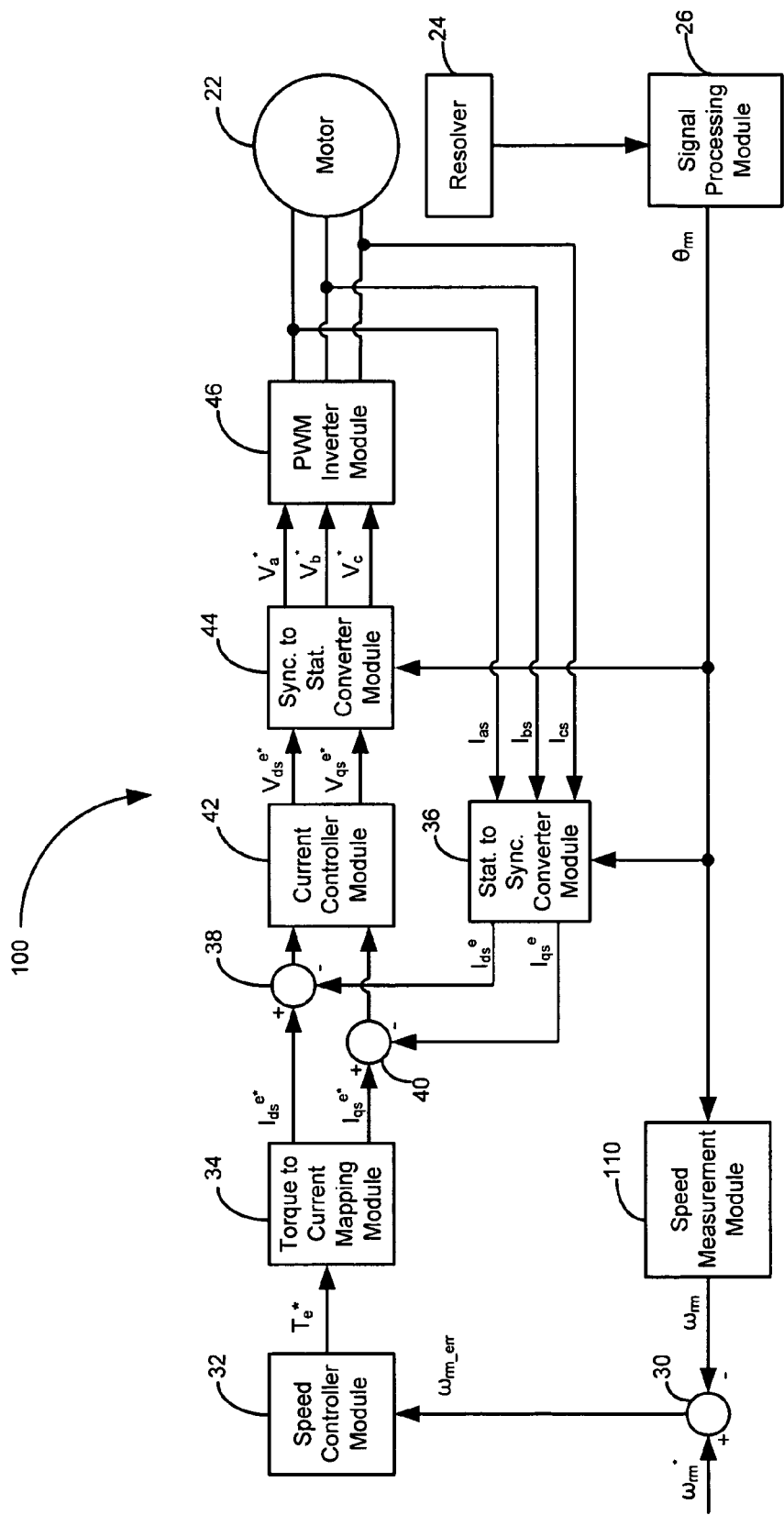
FIG. 6 is a functional block diagram illustrating a control system that controls the speed of a high-speed AC motor using the present invention.

Referring now to FIG. 6, a motor speed control system 100 includes a motor 22. A position sensor, such as a resolver 24 or an encoder (not shown), and a signal processing module 26 measure rotor angle $\theta_{rm}$. A speed measurement module 110 determines motor speed $\omega_{rm}$ from the rotor angle. A comparator module 30 determines the difference between the measured speed $\omega_{rm}$ and a command speed $\omega_{rm*}$. The difference, $\omega_{rm\_err}$, is fed to a speed controller module 32 that generates a torque command $T_{e*}$ to minimize the speed difference. Based on the torque command, a torque-to-current mapping module 34 generates d and q-axis command currents $I_{ds}^{e*}$ and $I_{qs}^{e*}$.

Current sensors (not shown) measure stationary phase motor currents $I_{as}$, $I_{bs}$, and $I_{cs}$. A stationary to synchronous phase converter module 36 converts the currents $I_{as}$, $I_{bs}$, and $I_{cs}$ to d and q-axis synchronous phase currents $I_{ds}^{e}$ and $I_{qs}^{e}$. A comparator module 38 determines the difference between the currents $I_{ds}^{e*}$ and $I_{ds}^{e}$. Another comparator module 40 determines the difference between the currents $I_{qs}^{e*}$ and $I_{qs}^{e}$. Based on the difference in the currents, a current controller module 42 generates synchronous phase command voltages $V_{ds}^{e*}$ and $V_{qs}^{e*}$.

A synchronous to stationary phase converter module 44 converts the voltages $V_{ds}^{e*}$ and $V_{qs}^{e*}$ to stationary phase command voltages $V_{a*}$, $V_{b*}$, and $V_{c*}$. Based on the command voltages, an inverter module 46 generates 3-phase voltages that drive the motor at the command speed.

Figure 7:
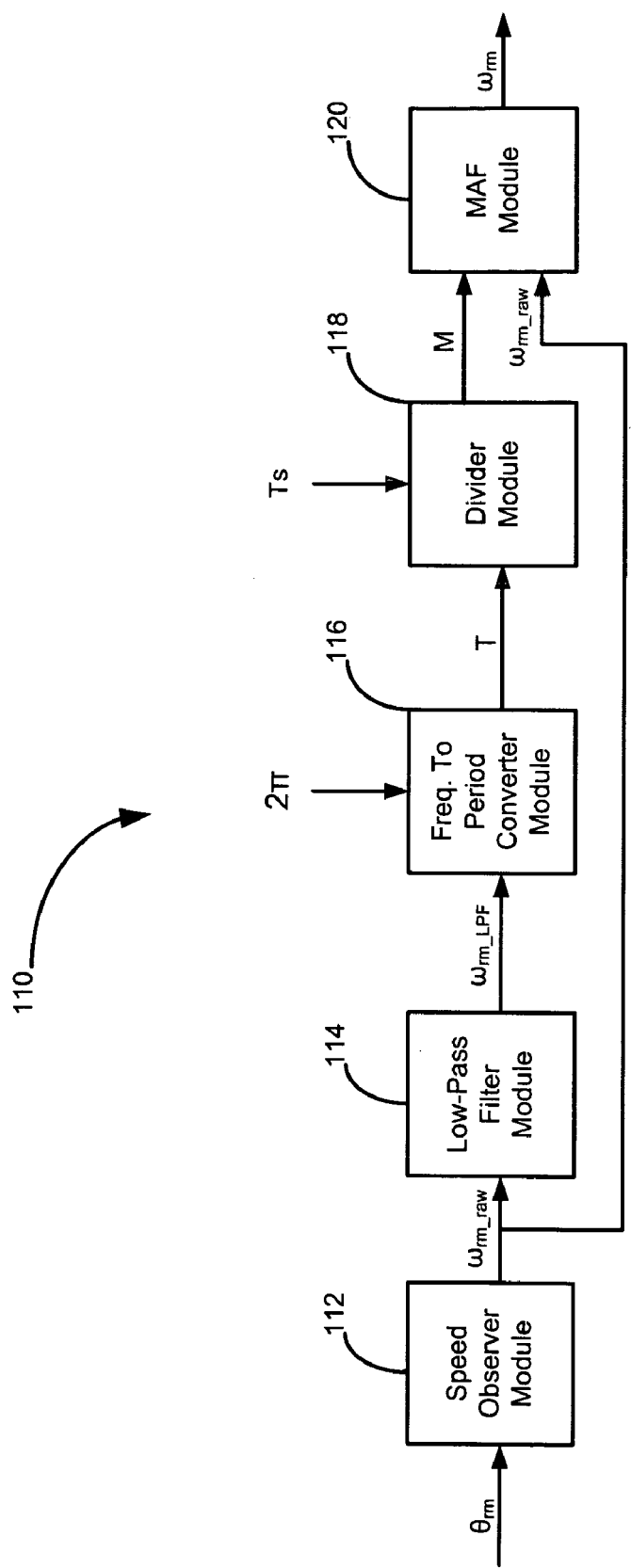
FIG. 7 is a functional block diagram illustrating a system for measuring speed of a high-speed AC motor using the present invention.

Referring now to FIG. 7, a system of measuring speed of a motor will be described in detail. A speed measurement module 110 includes a speed observer 112. The speed observer 112 calculates raw speed $\omega_{rm\_raw}$ of the rotor from rotor angle $\theta_{rm}$. If an encoder (not shown) is used instead of a resolver 24, the raw speed of the rotor can be calculated from the pulse train data using a signal processing module 26.

The rotor angle has a periodic error due to factors such as eccentricity of sensor, inaccuracy of electrical module etc. As a result, the raw speed $\omega_{rm\_raw}$ of the rotor has a fluctuating error called ripple. A low-pass filter module 114 reduces the ripple in the raw speed of the rotor and generates a filtered rotor speed $\omega_{rm\_LPF}$. A frequency to period converter module 116 calculates the rotational period T of the rotor from the speed of the rotor using the equation:

$$T = \frac{2\pi}{|\omega_{rm\_LPF}|}$$

For every sampling time $T_s$ that the control system executes control, a divider module 118 calculates the number of points M in a moving average by dividing the period T of the rotor by the sampling time $T_s$.

A window size of a moving average filter (MAF) is obtained by multiplying the number of points M in the moving average by a given sampling time $T_s$. Thus, at a given sampling time $T_s$, the window size of a MAF with M points is $MT_s$. Generally, however, the window size can be simply represented by M.

A MAF module 120 adjusts the window size of the MAF to the rotor period T. The MAF removes the ripple and all harmonics of the ripple from the raw speed of the rotor and generates motor speed $\omega_{rm}$ using the equation:

$$\omega_{rm}[i] = \frac{1}{M} \sum_{j=0}^{M-1} \omega_{rm\_raw}[i+j].$$

Figure 8:
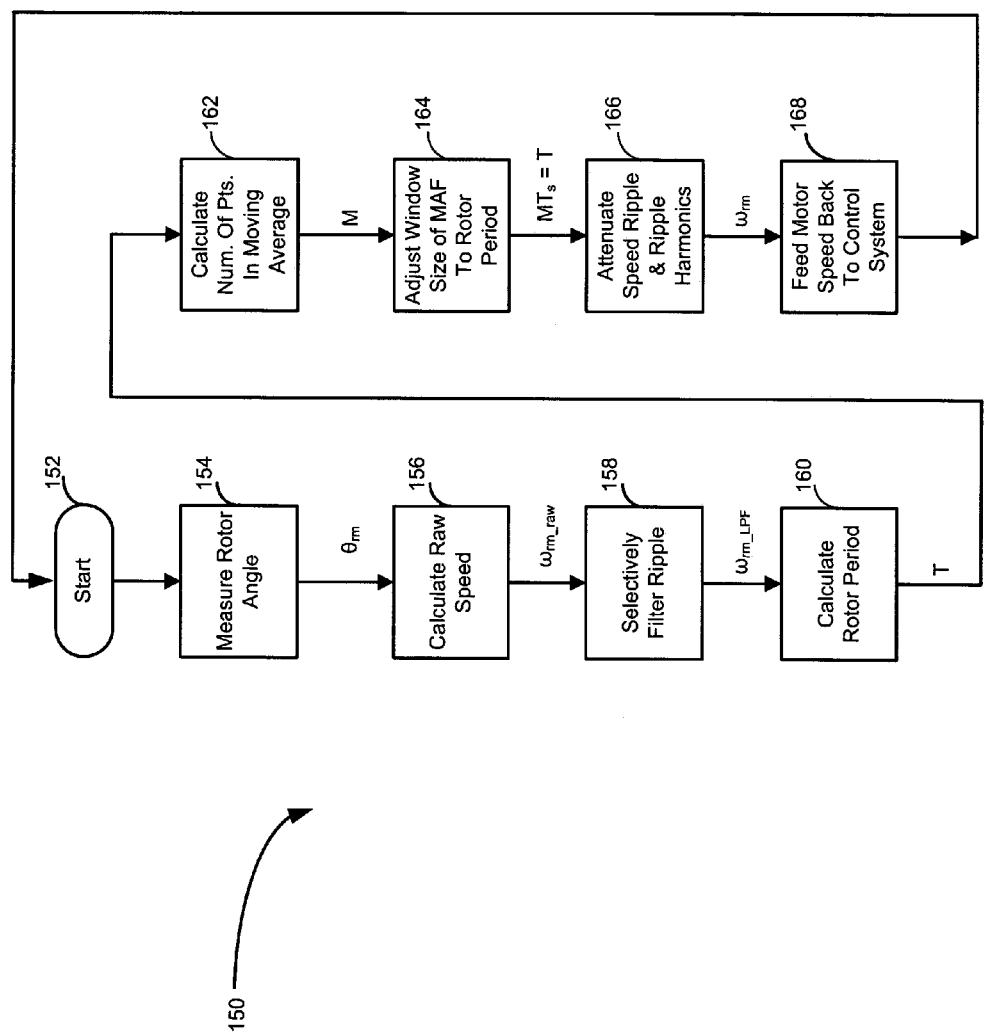
FIG. 8 is a flowchart illustrating steps performed in a method for measuring speed of a high-speed motor system according to the present invention.

Referring now to FIG. 8, a method of measuring speed of a motor will be described in further detail. The method 150 begins at step 152 at a sampling time $T_s$. In step 154, rotor angle $\theta_{rm}$ is measured using a resolver 24, or an encoder (not shown), and a signal processing module 26. In step 156, a speed observer module 112 determines raw speed $\omega_{rm\_raw}$ of the rotor from the rotor angle. In step 158, a low-pass filter 114 removes some of the ripple from the raw speed of the rotor and generates speed $\omega_{rm\_LPF}$.

In step 160, a frequency to period converter module 116 divides $2\Pi$ by $\omega_{rm\_LPF}$ to obtain rotational period T of the rotor. In step 162, a divider module 118 divides the period T by the sampling time $T_s$ to obtain number of points M in a moving average. In step 164, a MAF module 120 adjusts the window size of the MAF to the period T of the rotor. In step 166, the MAF module 120 removes the ripple and all harmonics of the ripple from $\omega_{rm\_LPF}$ and generates motor speed $\omega_{rm}$. In step 168, the speed $\omega_{rm}$ is fed back to the speed control system 100, and the method repeats at another sampling time $T_s$.

A MAF operates by averaging a number of points from the input signal to produce each point in the output signal. This can be expressed in equation form as:

$$y[i] = \frac{1}{M} \sum_{j=0}^{M-1} x[i+j],$$

where x[ ] is the input signal, y[ ] is the output signal, and M is the number of points in the average. Thus, in a 7-point MAF, for example, point 10 in the output signal is given by:

$$y[10] = \frac{x[10] + x[9] + x[8] + x[7] + x[6] + x[5] + x[4]}{7}.$$

The frequency response of a MAF can be expressed by the equation:

$$G[f] = \frac{\sin(\pi f T_s M)}{M \sin(\pi f T_s)},$$

where f is the frequency of the input signal in Hertz, $T_s$ is the sampling period in seconds, and M is the number of points in the average.

The frequency response of a MAF is such that it has infinitive attenuation at frequencies with periods equal to the window size $MT_s$ of the filter and its $n^{th}$ harmonics. Thus, for frequencies $$f = \frac{n}{T_S M},$$

where n is a positive integer (n=1, 2, 3, . . . ), the frequency response of a MAF is zero and can be expressed in equation form as:

$$G[f] = \frac{\sin(\pi n f T_s M)}{M \sin(\pi f T_s)} = \frac{\sin(\pi n)}{M \sin(\pi / M)} = 0.$$

Figure 9:
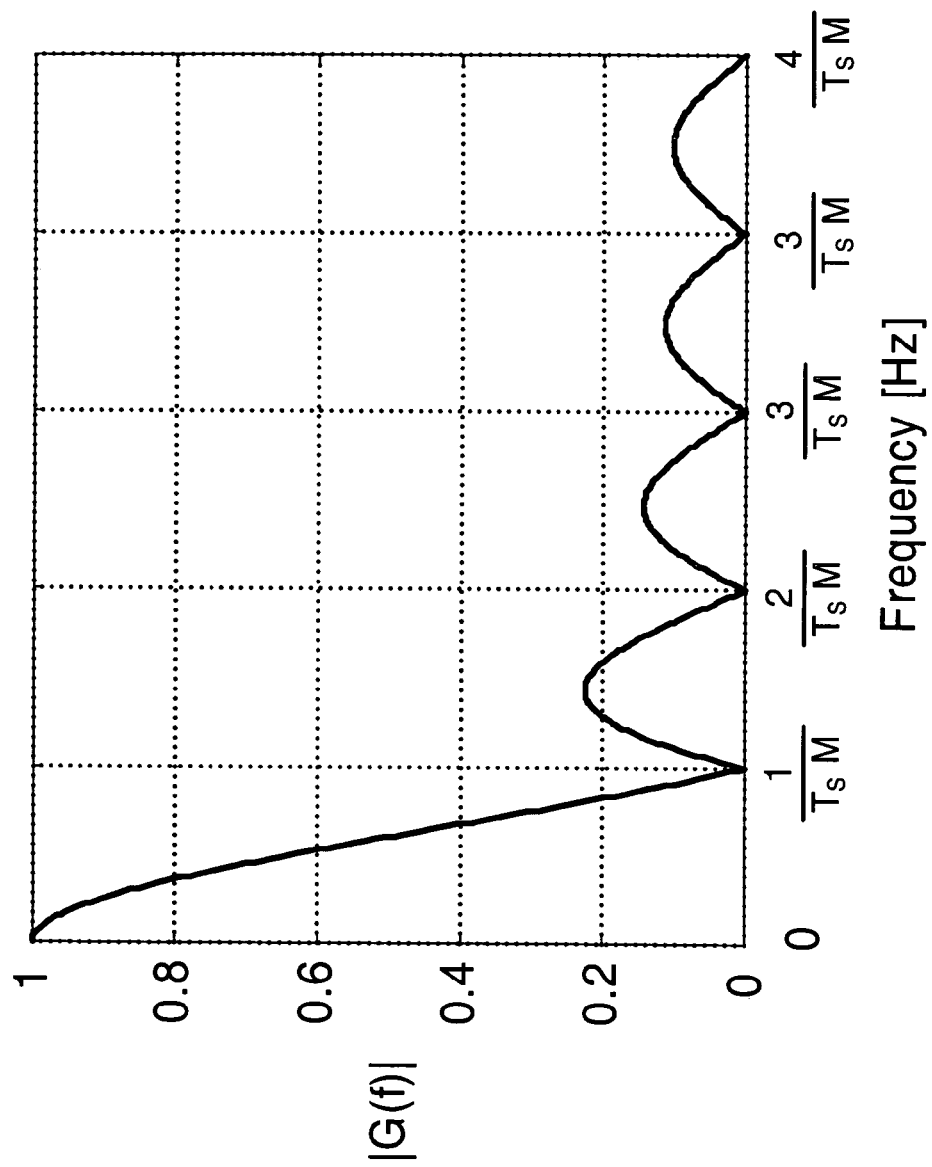
FIG. 9 is a graph illustrating frequency response of a moving average filter.

Thus, as FIG. 9 shows, the frequency response of a MAF is zero at frequencies $$\left(\frac{1}{T_S M}, \frac{2}{T_S M}, \frac{3}{T_S M}, \frac{4}{T_S M}, \dots, \frac{n}{T_S M}\right).$$

Therefore, if the window size of a MAF is adjusted to the fundamental period of the ripple, the MAF completely removes the ripple and all harmonics of the ripple. Since the fundamental period of the ripple is equal to the period T of the rotor, the window size of the MAF is adjusted to the period T of the rotor to completely remove the ripple and all harmonics of the ripple from the speed of the rotor.

Figure 10:
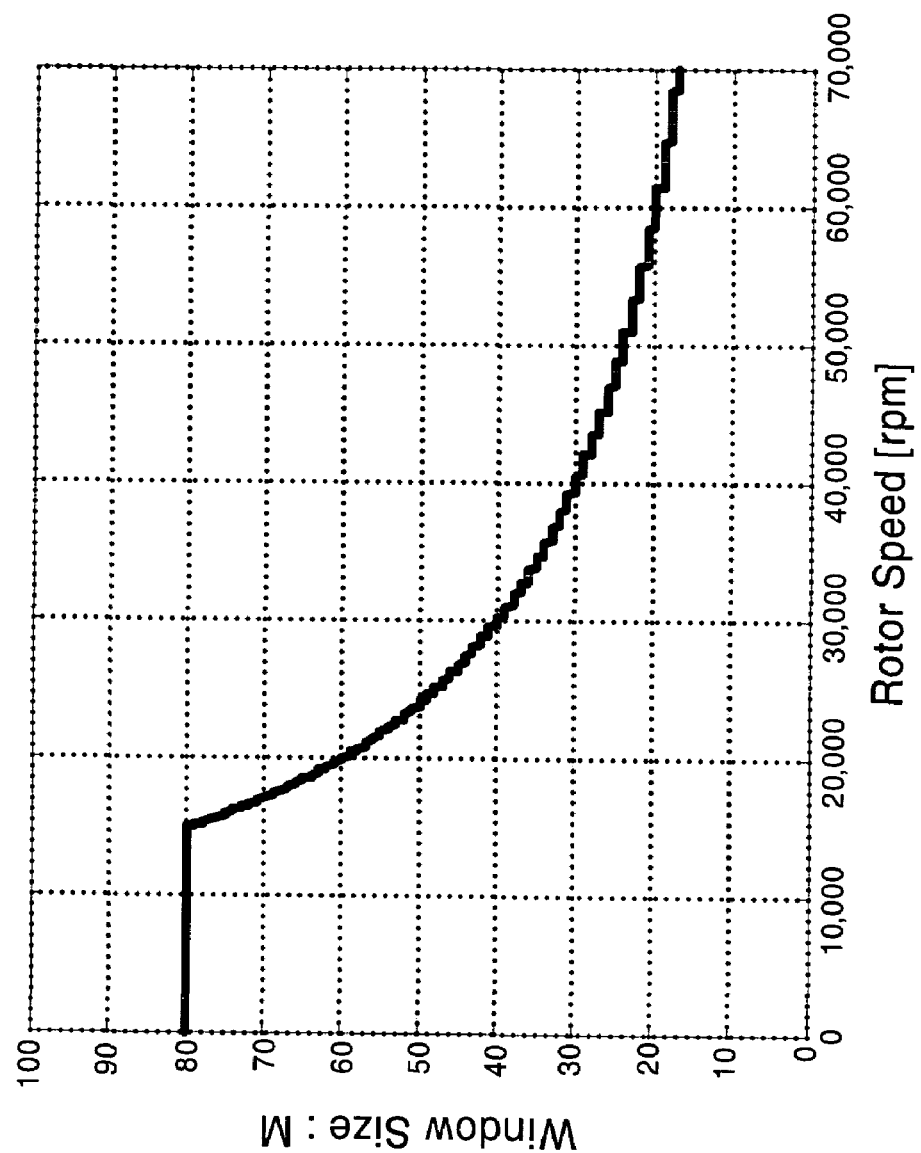
FIG. 10 is a graph illustrating exemplary relationship between window size of a moving average filter and rotor speed.
Figure 11:
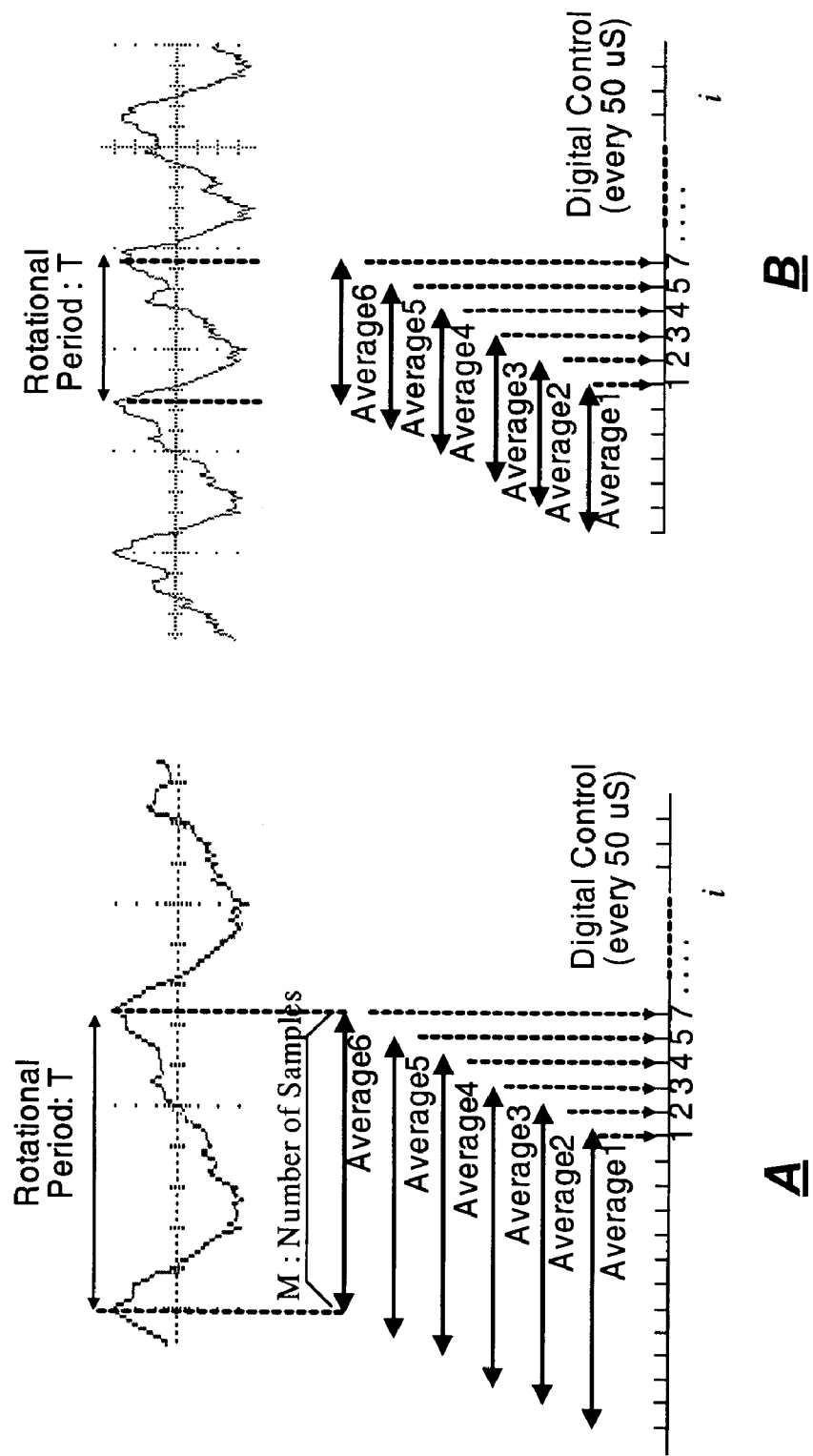
FIG. 11A is a graph illustrating exemplary relationship between window size of a moving average filter and ripple at low rotor speed.
FIG. 11B is a graph illustrating exemplary relationship between window size of a moving average filter and ripple at high rotor speed.

The window size, however, has upper and lower limits. Consequently, the ripple cannot be completely removed when measuring motor speeds below a certain minimum and above a certain maximum value. As FIG. 10 shows, the window size is inversely proportional to the speed of the rotor. At very low speed, the window size becomes very large, the stop-band frequency of the MAF becomes very low, and the performance of the speed control system degrades. Therefore, the window size has a maximum limit $M_{MAX}$, and its value determines the lowest rotor speed that can be measured without ripple. Similarly, the window size has a minimum value $M_{MIN}$, and its value determines the highest rotor speed that can be measured without ripple. FIG. 11A further illustrates an exemplary relationship between window size of a MAF and ripple at low rotor speed. Similarly, FIG. 11B illustrates an exemplary relationship between window size of a MAF and ripple at high rotor speed.

Notably, the window size of the MAF fluctuates due to the ripple present in the raw speed of the rotor. If the window size fluctuates, the ripple in the raw speed of the rotor is reduced but not completely removed. Using a low-pass filter to remove some of the ripple in the raw speed of the rotor reduces the fluctuation in the window size of the MAF. Thus, the MAF attenuates the ripple present in the raw speed of the rotor more effectively when a low-pass filter is used to calculate the window size of the MAF.

Figure 12:
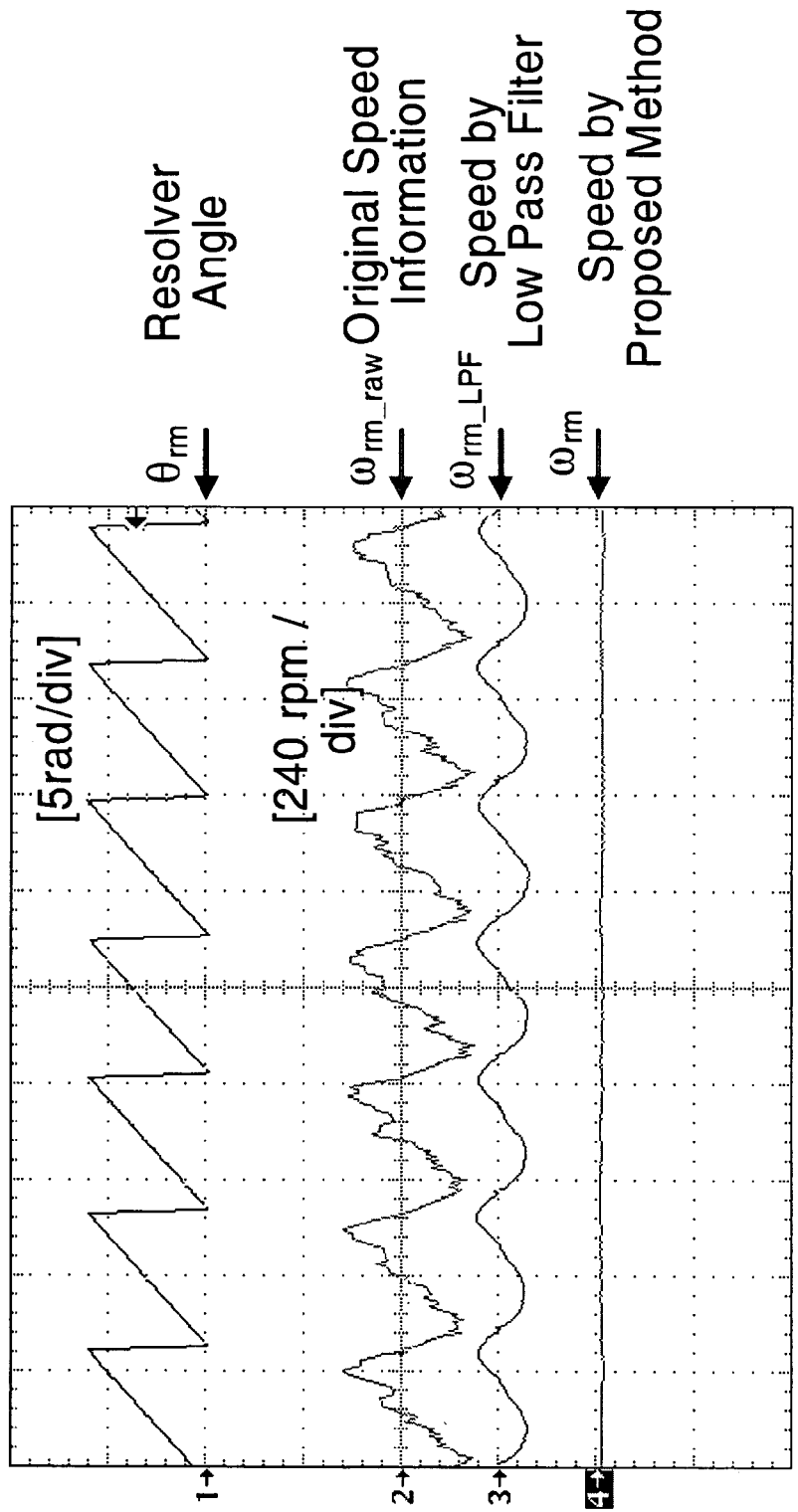
FIG. 12 is a graph illustrating exemplary performance of the speed measurement method of the present invention.
Figure 13:
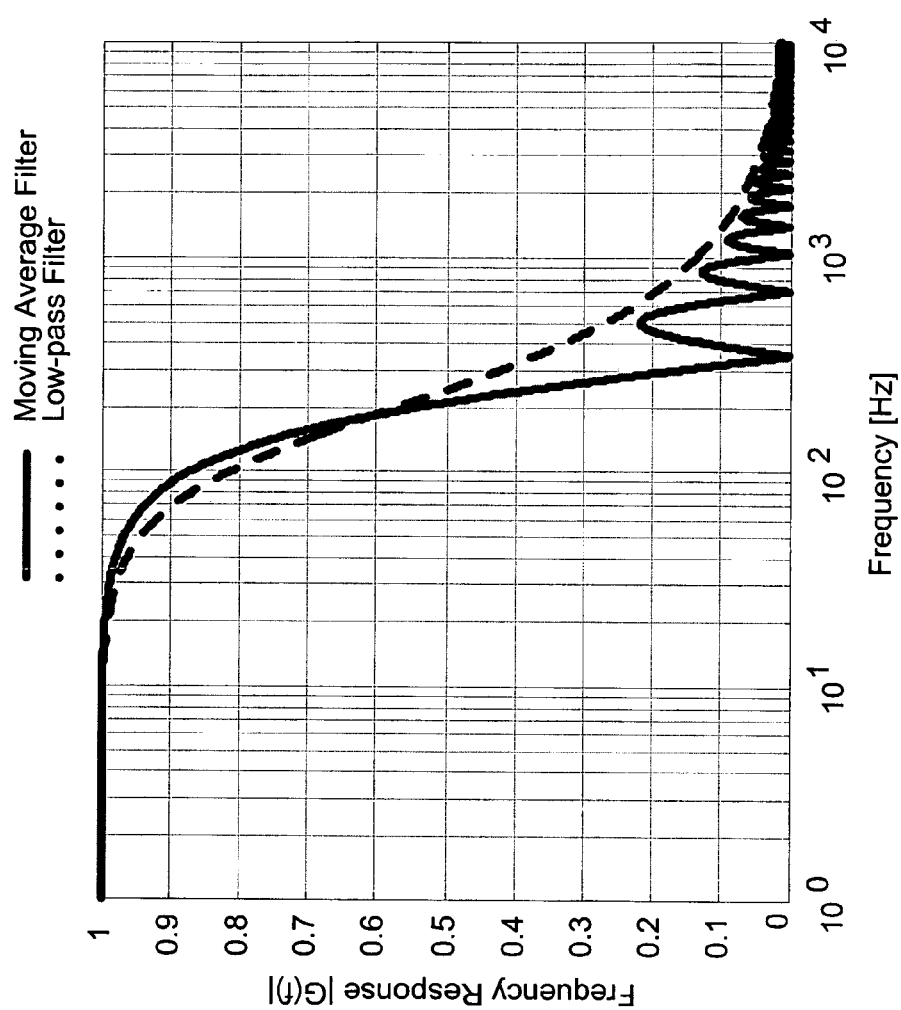
FIG. 13 is a graph illustrating exemplary comparison between frequency responses of a moving average filter and a low-pass filter.

As FIG. 12 shows, the speed $\omega_{rm}$ contains no ripple when the window size of the MAF is adjusted to the period T of the rotor. This is because, as FIG. 13 shows, the attenuation of the MAF is infinite when its window size is adjusted to the period of the rotor.

Figure 14:
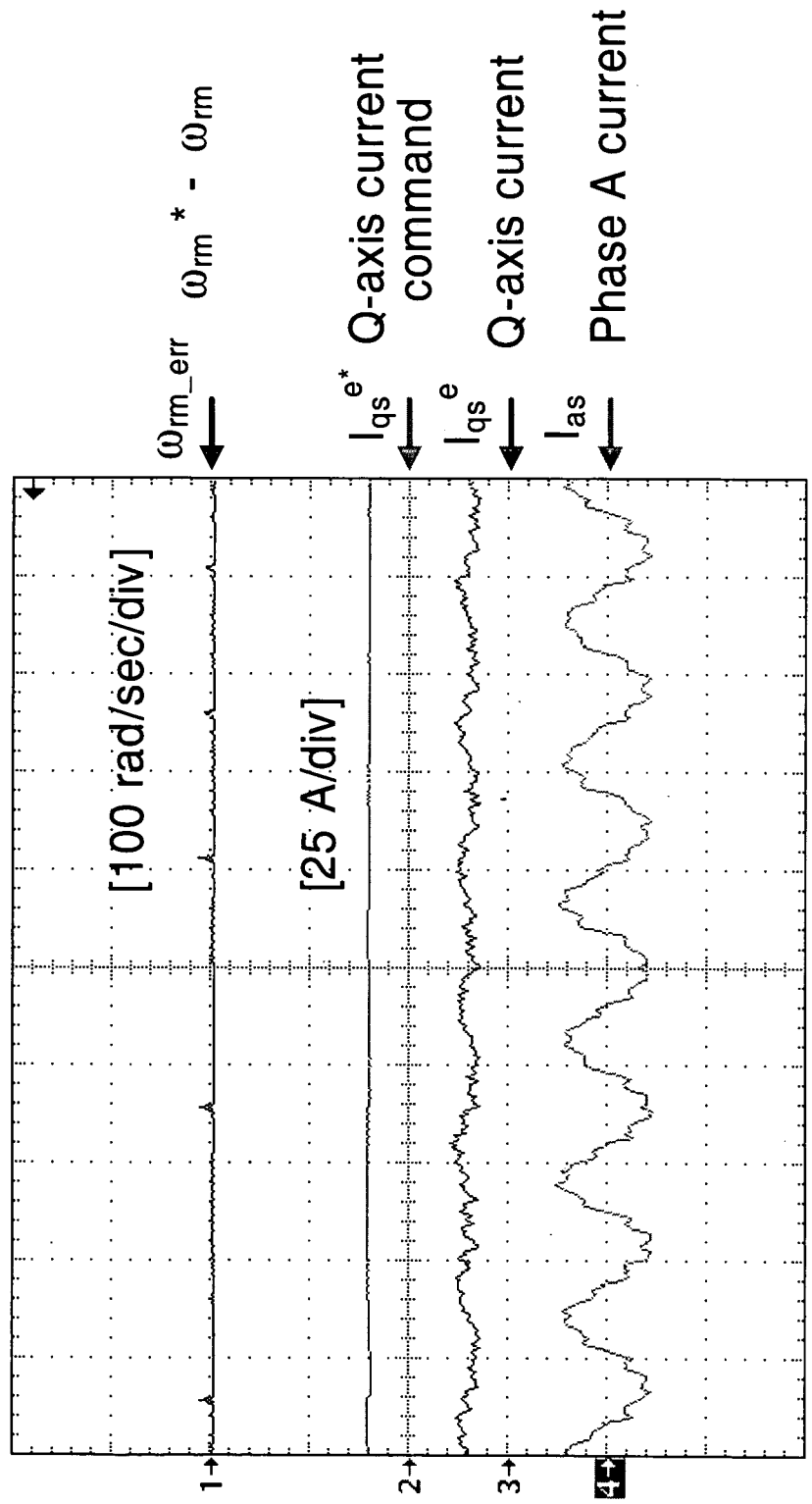
FIG. 14 is a graph illustrating exemplary current waveforms obtained using the speed measurement method of the present invention.

Thus, the ripple is significantly eliminated from $\omega_{rm\_err}$ when the motor speed $\omega_{rm}$ is measured using the MAF with its window size adjusted to the period of the rotor, as shown in FIG. 14. As a result, the periodic fluctuations in the command currents and actual motor currents are significantly reduced. The residual fluctuation in the motor currents is due to current measurement errors caused by factors such as number of sensors used, leakage inductance of the motor, etc. FIG. 14 also shows that the motor current waveform is substantially sinusoidal and contains few harmonics when the MAF used. This low distortion in the motor currents also reduces heating and loss caused by harmonics.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification, and the following claims.

What is claimed is:

1. A method of measuring speed of a high-speed motor, comprising:
    generating a rotor position signal;
    determining a rotor angle from the rotor position signal;
    calculating a raw speed of the motor from the rotor angle and generating a raw speed signal;
    selectively generating a filtered speed of the motor from the raw speed of the motor and generating a filtered speed signal by filtering the raw speed signal;
    calculating a rotor period from one of the raw speed and the filtered speed signals;
    calculating a number of sample points in a moving average using the rotor period; and
    controlling the speed of the motor based on the number of sample points in the moving average.

2. The method of claim 1 further comprising adjusting a window size of the moving average to the rotor period.

3. The method of claim 2 further comprising removing ripple and harmonics of the ripple from the raw speed of the motor.

4. The method of claim 3 further comprising removing harmonics of the ripple from the raw speed of the motor.

5. The method of claim 2 further comprising calculating the window size based on the number of points in the moving average and a sampling time.

6. A system for measuring speed of a high-speed motor, comprising:
    a position sensor that generates a rotor position signal;
    a signal processing module that determines a rotor angle from the rotor position signal;
    a speed observer module that calculates a raw speed of the motor from the rotor angle;

a filter module that selectively generates a filtered speed of the motor from the raw speed of the motor;

a frequency-to-period converter module that calculates a rotor period from one of the raw speed of the motor and the filtered speed of the motor; and a divider module that calculates a number of sample points in a moving average using the rotor period.

7. The system of claim 6 further comprising a moving average filter module that adjusts a window size of a moving average filter to the rotor period.

8. The system of claim 7 further comprising a moving average filter that removes ripple from the raw speed of the motor.

9. The system of claim 8 wherein the moving average filter removes harmonics of the ripple from the raw speed of the motor.

10. The system of claim 7 wherein the moving average filter module calculates the window size based on the number of points in the moving average and a sampling time.

* * * * *